(12) United States Patent
Johnson

(10) Patent No.: US 8,708,342 B1
(45) Date of Patent: Apr. 29, 2014

(54) PNEUMATICALLY CONTROLLED DUAL MODE FACE SEAL

(75) Inventor: Philip M Johnson, Durham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 86 days.

(21) Appl. No.: 13/546,709

(22) Filed: Jul. 11, 2012

Related U.S. Application Data

(60) Provisional application No. 61/510,096, filed on Jul. 21, 2011.

(51) Int. Cl.
*F16J 15/34* (2006.01)

(52) U.S. Cl.
USPC .......................... 277/408; 277/401; 277/358

(58) Field of Classification Search
USPC ................. 277/358, 399, 401, 408, 409
See application file for complete search history.

(56) References Cited

U.S. PATENT DOCUMENTS

| | | | | | |
|---|---|---|---|---|---|
| 6,059,293 | A | * | 5/2000 | Azibert et al. | 277/358 |
| 6,068,263 | A | * | 5/2000 | Azibert et al. | 277/370 |
| 6,068,264 | A | * | 5/2000 | Azibert et al. | 277/370 |
| 6,131,912 | A | * | 10/2000 | Azibert et al. | 277/358 |
| 6,213,472 | B1 | * | 4/2001 | Bondarenko et al. | 277/399 |
| 6,557,856 | B1 | * | 5/2003 | Azibert et al. | 277/401 |

* cited by examiner

*Primary Examiner* — Gilbert Lee
(74) *Attorney, Agent, or Firm* — Joseph E. Funk; Daniel J. Long

(57) ABSTRACT

A pneumatically controlled, two part, rotational face seal is disclosed that has dual modes of operation. There is a first, static mode where a face of each of the two parts of the seal touch each other and provide an air, liquid and water vapor tight, very low leakage rate with high rotational friction between the two parts of the seal. In the second, dynamic mode wherein the two parts of the seal are separated by inert gas and the face seal functions as a gas bearing having very low rotational friction as the two parts are rotated with respect to each other. One part of the seal may be attached to a rotatable turret and the other part may be attached to a base on which the turret is mounted.

18 Claims, 6 Drawing Sheets

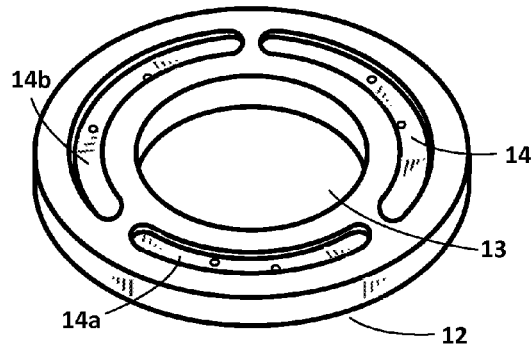
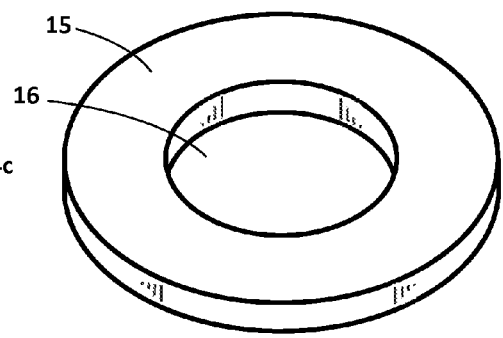
Figure 1
Figure 3
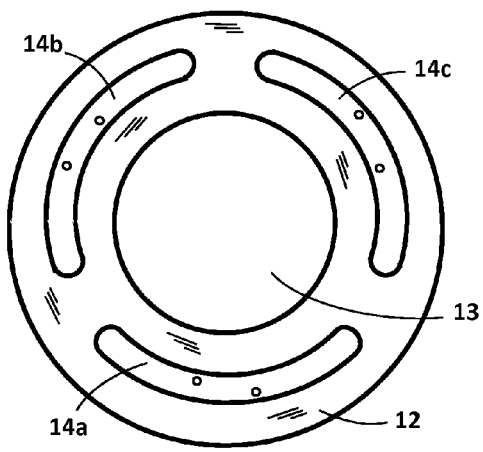
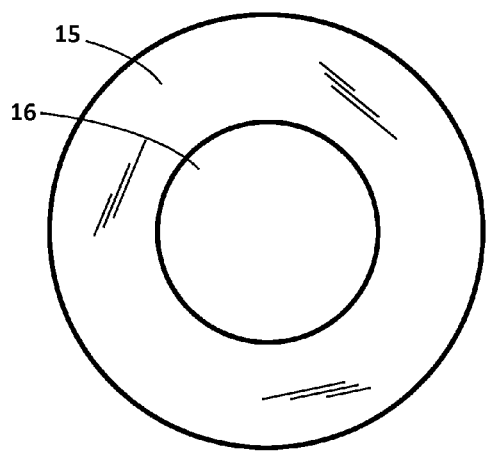
Figure 2
Figure 4

PNEUMATICALLY CONTROLLED DUAL MODE FACE SEAL

CROSS REFERENCE TO RELATED APPLICATIONS

This application claims the benefit of Provisional Patent Application Ser. No. 61/510,096 filed Jul. 21, 2011.

STATEMENT OF GOVERNMENT INTEREST

The invention was made with United States Government assistance under contract No. W56 HZV-05-C-0724 awarded by the US Army. The United States Government has certain rights in the invention.

FIELD OF THE INVENTION

The present invention relates to rotational seals, and more specifically to pneumatically powered rotational seals.

BACKGROUND OF THE INVENTION

Transparent spherical domes mounted on a base do not require dynamic seals, but require very precise mechanical centration of interior gimbal mechanisms, are expensive and often fragile, or exhibit high optical scattering. Spring loaded rotary Teflon seals are in common use, but rotational friction is often higher than desired, the seal often has greater leakage than desirable when the gimbal mechanism is not rotating, and seal replacement is needed more often than desirable.

Conventional spring-energized, dynamic (rotary joint), rotational Teflon seals often compromise between friction of adjacent elements of the seal and the inward leak rate of water vapor or water around the seal. The negative result is generally that the leak rate around the rotational seal is high enough to require frequent maintenance action, such as gas purging and desiccant replacement and, at the same time, there is much higher friction between the dome and the base upon which it rotates than is desirable. In some infrared and electro-optic systems, the rotary motion between a dome and its base is only required for a relatively short period that is defined by the external cueing and/or test signals.

A need therefore exists in the art for a dynamic rotational seal that has a rotational friction that is much lower than found in the prior art, and has improved environmental sealing against air, moisture and other contaminants external to the dome or a rotary sealed turret in cued or operation upon command pointing and tracking systems. In addition, a need exists in the art for a dynamic rotational seal that requires much less maintenance than prior art seals.

SUMMARY OF THE INVENTION

To solve the aforementioned problems of the prior art a pneumatically powered, dual mode, rotational face seal having two states is disclosed. In a first, static state, the novel face seal functions as an air, liquid and water vapor tight, high friction seal between two components with a very low leakage rate, such as a turret (e.g. a dome) and a base on which the turret is mounted. In its second, dynamic state, to which the seal is quickly and easily converted, the face seal functions as a gas bearing having very low friction in order to easily rotate the turret with respect to a base on which the turret is mounted. This is done with minimal loss of gas used to create and maintain the gas bearing. The advantages of the dynamic, dual mode rotational seal when in the dynamic gas bearing mode are extremely low friction, and when in the static mode a very low gas leak rate from between elements of the seal, resulting in a much increased time between any needed maintenance actions.

The novel rotational face seal comprises a first flat seal plate that is attached to the base to which a rotatable turret is mounted, and a second flat seal plate that is mounted to be flexibly attached to the rotatable turret, allowing a small amount of axial movement. When the turret is not being rotated with respect to the base the first and second flat seal plates are in the first, static state where the first and second seal plates are in face to face contact to create an air and water vapor tight seal. A flexible support between the turret and the second flat seal plate allows the required small axial movement and also provides a static seal between the second face of the second seal plate to the turret, both when the turret is not rotating and when it is rotating.

When it is desired to rotate the turret with respect to the base, the seal is converted to its second, dynamic state where it functions in a manner similar to that of a gas bearing. To accomplish the conversion dry, high pressure gas is momentarily injected via holes through the first flat seal plate with a sufficient first pressure to break the static air and liquid tight seal between the first seal plate and the second seal plate, causing a small axial (perpendicular to the plane of the seal faces) displacement of the second plate away from the first plate. After the air and liquid tight seal is broken the first gas pressure is replaced by a lower second gas pressure that is sufficient to maintain a dynamic gas bearing between the first seal plate and the second seal plate. This mode is continued as long as any motion, including precision pointing of the turret at moving objects, is required. When movement of the turret is no longer required, the second gas pressure is removed which terminates the gas bearing and the first flat seal plate and the second flat seal plate again come into face to face contact to reestablish the static, air and liquid tight seal between them which is the first, static state. Thus, there is a high sealing force, a low leak rate around the seal, and a high friction torque in the static state. In addition, the novel face seal needs much less maintenance than prior art rotational seals.

DESCRIPTION OF THE DRAWING

The invention will be better understood upon reading the following Detailed Description in conjunction with the drawing in which:

FIG. 1 is a perspective view of the first, lower flat seal plate with gas channels;

FIG. 2 is a top view of the first, lower flat seal plate with gas channels;

FIG. 3 is a perspective view of the second, upper flat seal plate;

FIG. 4 is a top view of the second, upper flat seal plate;

DETAILED DESCRIPTION

Figure 5:
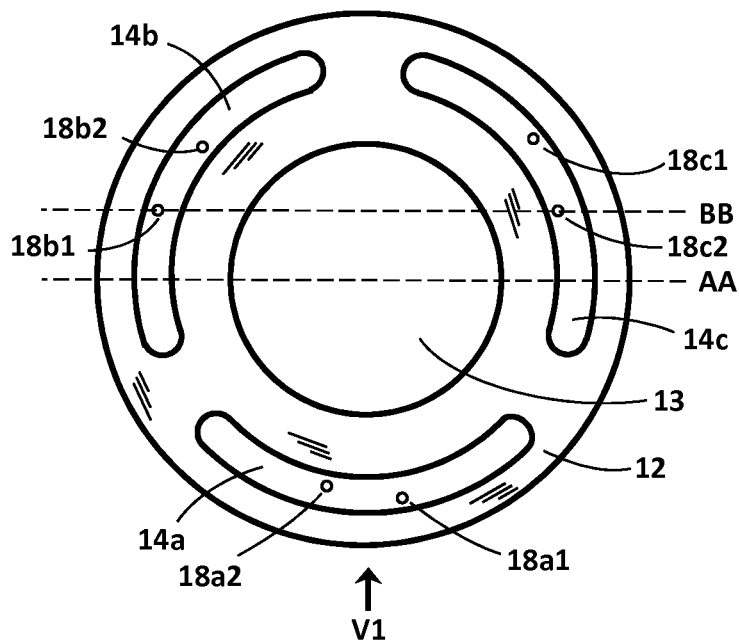
FIG. 5 is a top view of the first, lower seal plate identifying holes through the lower seal plate via which gas pressure is applied to create a gas bearing for easy rotation of the upper seal plate and a turret to which it is flexibly attached with respect to the lower seal plate.

The invention is a novel pneumatically controlled, dual mode, two part, face seal used between two elements where one of the elements will rotate with respect to the other of the two elements. The novel dual mode face seal provides low friction, low leak rate, and much increased time between maintenance actions. The two modes or states are a first static mode and a second dynamic mode. In the static mode there is an air and liquid tight seal between the two parts of the face seal and in the dynamic mode an air bearing is created between the two parts of the face seal. The air bearing permits the two parts of the face seal to easily rotate with respect to each other.

More specifically, in the preferred embodiment of the invention described in detail herein, the two elements between which the face seal is mounted are a turret (e.g. a rotatable dome) and a base on which the turret is mounted. The turret is element number 21 in FIG. 11 and the base is element number 17 in FIG. 12 which are described in detail hereinafter. Turret 12 is shown combined with base 17 in FIGS. 13 and 14. The turret and base are also shown in and described in detail with reference to other figures.

The two parts of the novel face seal are lower face seal 12 shown in greatest detail in FIGS. 1, 2, and 5-10, and upper face seal 15 shown in greatest detail in FIGS. 3 and 4. The upper and lower face seals are also shown in other figures.

In FIG. 1 is shown a perspective view of the first or lower face seal 12. Face seal 12 is flat, has a diameter of 4.00 inches, is 0.375 inches thick and has a hole 13 through its center that has a diameter of 2.75 inches. There are three very shallow arcuate grooves 14a, 14b and 14c spaced 120 degrees from each other, and the grooves all have a depth of 0.00075±0.00025 inches. Each of the arcuate grooves has an angular distance of one-hundred ten degrees. The arcuate length of the spacing between the arcuate grooves is ten degrees. In all figures of the drawing the depth of grooves 14a, 14b and 14c are exaggerated and are shown much deeper only than they actually are for the sake of convenience.

Lower seal plate 12 is made of sapphire and its upper surface, facing upper seal plate 15, is coated with a thin film of Teflon in the preferred embodiment of the invention. The thickness of the Teflon film is included in the 0.375 inches thickness of seal plate 12. To create the thin Teflon film Teflon AF (liquid form) is utilized and it is applied by spin coating, which is known in the art, and creates a very thin, uniform thickness film. Lower seal plate 12 is made very flat and the tolerance is within one-quarter wavelength at 628 nanometers peak to valley and 0.08 wavelength RMS. Lower plate seal 12 is also coated with Teflon in the same manner as the upper plate seal 15. In an alternative embodiment of the invention the Teflon or other coating may be eliminated. The seal plate may be of other materials capable of sufficient stiffness and surface flatness.

As may be seen in FIG. 1, in each of arcuate grooves 14a, 14b and 14c, there are two holes through lower seal plate 12. As shown and identified in FIG. 5 groove 14a has holes 18a1 and 18a2, groove 14b has holes 18b1 and 18b2, and groove 14c has holes 18c1 and 18c2. Each of these holes extends vertically through lower seal plate 12. All these holes have a diameter of 0.050 inches, and the top of each hole has a slightly larger portion with a diameter of 0.060 inches and a depth of 0.030 inches. While not specifically shown in the figures a sapphire orifice bead is fitted into the larger top portion of each of the six holes.

The two holes in each of the three arcuate grooves 14a, 14b and 14c that go through lower seal plate 12 are spaced an angular distance of fifteen degrees and are lengthwise centered in each of the arcuate grooves.

Figure 17:
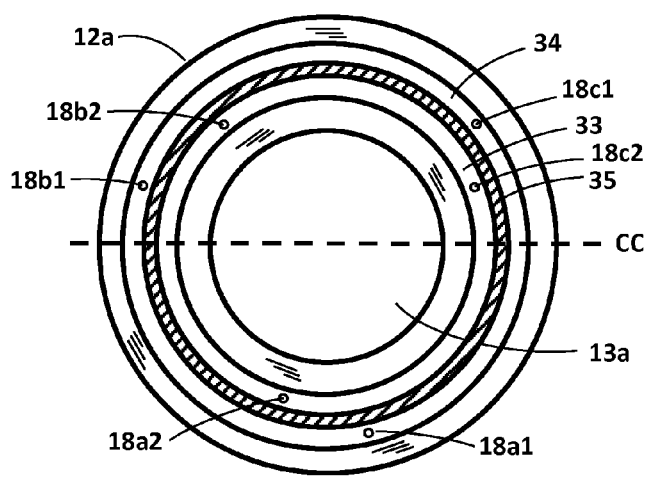
FIG. 17 is a top view of an alternate embodiment of the lower seal plate having two circular channels in its top surface.

In FIG. 2 is shown a top view of lower seal plate 12 that better shows the location of the six holes 18a1, 18a2, 18b1, 18b2, 18c1 and 18c2 (also see FIG. 5) through lower seal plate 12. In an alternate embodiment of the invention only two, longer arcuate grooves may be utilized in the upper surface lower seal plate 12. Another embodiment of the lower seal plate 12 is shown in FIG. 17 and is described in detail further in this Detailed Description.

In FIG. 3 is shown a perspective view of upper seal plate 15. Upper seal plate 15 also has a diameter of 4.00 inches, is 0.375 inches thick including a Teflon AF layer on its lower surface, and has a hole 13 through its center that also has a diameter of 2.75 inches. Upper seal plate 15 is also made of sapphire and has the same degree of flatness as lower seal plate 12, as previously described. In an alternative embodiment of the invention a different coating may be utilized, or may be eliminated.

In FIG. 4 is shown a top view of upper seal plate 15.

In FIG. 5 is shown a top view of lower seal plate 12 with the six holes 18a1, 18a2, 18b1, 18b2, 18c1 and 18c2 through seal plate 12 all identified. At the bottom edge of FIG. 5 is a view arrow V1 indicating a side view from the bottom of lower seal plate 12 that is shown in FIGS. 6 and 7 as cutaway views BB and AA respectively.

Figure 6:
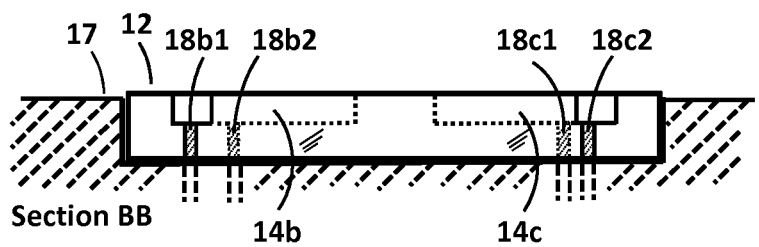
FIG. 6 is a first cutaway side view BB of the lower seal plate showing shallow recesses in its top surface into which gas is injected under pressure via holes through the lower seal plate.

FIG. 6 is cutaway side view BB of lower seal plate 12 as indicated in FIG. 5. In this cutaway view BB arcuate grooves 14b and 14c are shown, visible holes 18b1 and 18c2 are shown with solid lines, and non-visible holes 18b2 and 18c1 are shown with dotted lines. The full extent of arcuate grooves 14b and 14c are also shown with dotted lines. This is done to give the reader a better understanding of an arcuate groove and its two holes. Dimensions have previously been described.

Figure 7:
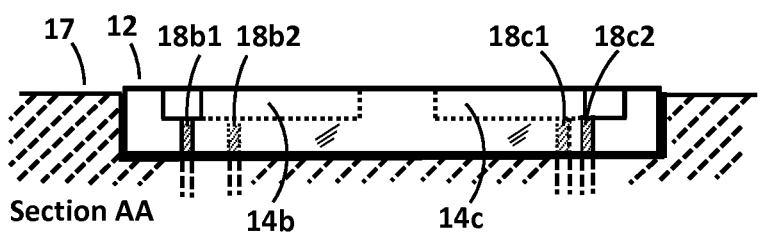
FIG. 7 is a second cutaway side view AA of the lower seal plate showing shallow recesses in its top surface into which gas is injected under pressure via holes through the lower seal plate.

In FIG. 7 is a cutaway side view AA of lower seal plate 12 as indicated in FIG. 5. In this cutaway view AA arcuate grooves 14b and 14c are also shown, visible holes 18b1 and 18c2 are shown with solid lines, and non-visible holes 18b2 and 18c1 are shown with dotted lines. The full extent of arcuate grooves 14b and 14c are also shown with dotted lines. This is done to give the reader a better understanding of an arctuate groove and its two holes. Dimensions have previously been described.

Figure 8:
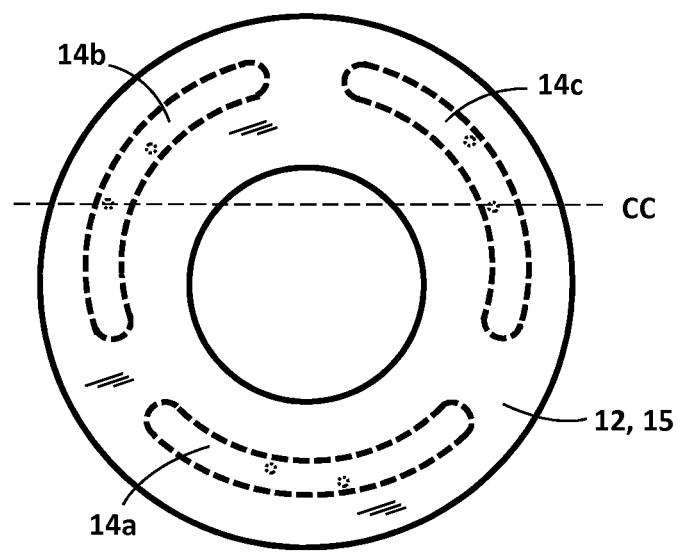
FIG. 8 is a top view of the upper seal plate on top of the lower seal plate.

In FIG. 8 is a top view of upper seal plate 15 on top of lower seal plate 12. Thus the arcuate grooves and their holes are not directly visible and are shown as dotted lines. A cutaway view CC is indicated that is shown in FIGS. 9 and 10 that better show the function of the dual mode seal.

Figure 9:
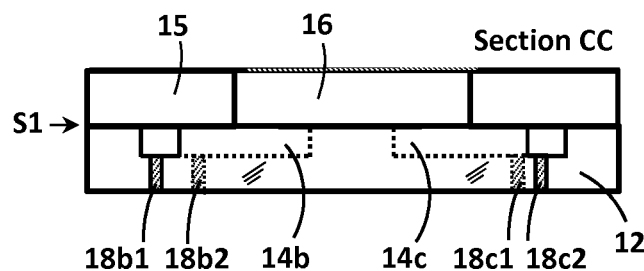
FIG. 9 is a third cutaway side view CC of the lower seal plate and the upper seal plate in their static mode in contact with each other to create and air and liquid tight seal between them.

In FIG. 9 is shown a side view of upper seal plate 15 sitting on top of lower seal plate 12 in the static mode of the novel dual mode seal. This static mode is characterized by high sealing force, low leak rate, and high friction torque. The space S1 between the two plates is, in essence, zero. The extreme flatness of these two plates, with one or more facing Teflon AF coatings, assures that an air and liquid tight seal is created by them. This will be better understood hereinafter with reference to the description of FIGS. 13 and 14. The two plates 12 and 15 are held together by gas pressure inside the system as described hereinafter with reference to FIG. 13. Cutaway view CC shown in this FIG. 9 is the same as cutaway view BB shown in FIG. 6 except for upper seal plate 15 being on top of lower seal plate 1 to create an air and liquid tight seal.

Figure 10:
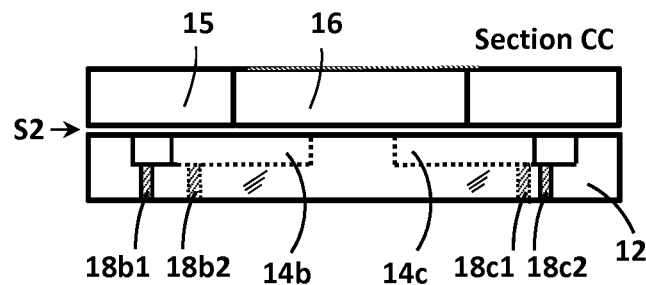
FIG. 10 is the third cutaway side view CC of the upper and lower seal plates after high pressure gas pressure is first applied between the plates after the seal between them has been broken by high gas pressure to separate them and low gas pressure is then applied to maintain a gas bearing between the two plates.

In FIG. 10 is shown a side cutaway view CC of upper seal plate 15 spaced above lower seal plate 12 (See FIG. 8). To initially separate seal plates 12 and 15 a pulse of high pressure inert gas (dry air or nitrogen at 60 psi) is applied via holes 18a1, 18b1 and 18c1 to arcuate grooves 14a, 14b and 14c respectfully. This pressure is sufficient to separate seal plates 12 and 15. All the arcuate grooves and the holes therein are not shown in FIG. 10, but they are seen in FIG. 8 and other Figures. The high pressure pulse of inert gas may be applied to all arcuate grooves at one time or, in an alternate embodiment of the invention, the pulse may be applied to the arcuate grooves in a sequential manner.

After the high pressure pulse(s) of inert gas separate(s) upper seal plate 15 and lower seal plate 12 to create a gap S2, a continuous lower pressure of dry inert gas at 25 psi is applied to holes 18a2, 18b2 and 18c2. The gas supplied to each hole passes through flow-restricting small bead orifices in the upper end of the holes as in typical air bearing technology, and emerges in arcuate grooves 14a, 14b and 14c respectively. This pressure and very small gas flow escaping from between the separated seal plates creates a gas bearing and maintains the separation of seal plates 12 and 15 in their dynamic mode. The use of the flow-limiting small bead orifices as in the existing art and three or more arcuate grooves results in both passive self-leveling of the upper seal plate and passive regulation of the gap width by a negative feedback process. For example, if the plate separation over a particular groove were to increase, the flow would at first increase, causing an increased pressure drop at the orifice. Therefore the pressure supplied to that groove would decrease, resulting in a corrective downward force applied to the upper seal plate over the lower plate groove in question and thereby causing the self-leveling action. When there are three or more grooves in the lower plate, this action causes an equilibrium gap width that is constant over the plate area and is a function of the input gas pressure and the orifice diameter. Either parameter may be modified to change the operating gap width. In the preferred embodiment, the pressure prior to each orifice is 25 psi and each orifice diameter is 0.0004 inches, which in the dynamic mode causes the spacing between seal plates 12 and 15 to be as little as 0.5 microns but typically of the order of 1.0 micron. In the dynamic mode upper seal plate is rotated with respect to lower seal plate 12. This is explained in more detail with reference to FIGS. 13-16. More particularly, in the dynamic mode there are gas molecules flowing outward whenever the plates are separated, which will sweep any exterior gas molecules outward with them. Some of the gas molecules injected under pressure also will also flow to the interior of the system to replenish any interior gas lost during long periods in the second (static) mode through various leak mechanisms.

At the end of the dynamic mode the spacing maintenance pressure is terminated and any dry inert gas between plates 12 and 15 is expelled by ambient pressure inside a system with which the novel dual mode seal is utilized. See FIGS. 13 and 14 where the system comprises a turret 21 and base 17. It is preferred that a positive gas pressure be maintained inside the system housing that will act as a spring-like force uniformly distributed on the seal ring plates 12 and 15 to hold them together tightly for lowest possible leakage to the atmosphere. A modest chamber pressure such as 8-10 psi above atmospheric pressure may result in a compressive force of well over 100 pounds on the seal plates in the static mode once the air between them has been removed. Positive chamber pressure also aids in the fast removal of residual gas between seal plates 12 and 15 for faster transition from their dynamic or separated mode to their static or closed mode. It would be very difficult to duplicate such a large and uniformly distributed sealing pressure by using springs or electromechanical devices. In another alternative use of the novel dual mode seal any dry inert gas between seal plates 12 and 15 at the end of its dynamic mode of operation may be pumped out to quickly re-establish a good air and liquid tight seal between seal plates 12 and 15.

In an alternate embodiment of the invention, not shown in the drawings, there is only a single hole through the lower seal plate 12 for each arcuate groove and only the high pressure inert gas is used to separate upper seal plate 15 and lower seal plate 12 to create a gap S2, and to maintain the separation of the plates. This alternate embodiment is less efficient than the preferred embodiment which uses high pressure and low pressure gas as described herein, and in many applications the flow regulating orifices would have to be eliminated because they would cause a much slower process of plate separation. However, if the orifices were eliminated the self-leveling and gap regulation functions described above would not be available.

Figure 11:
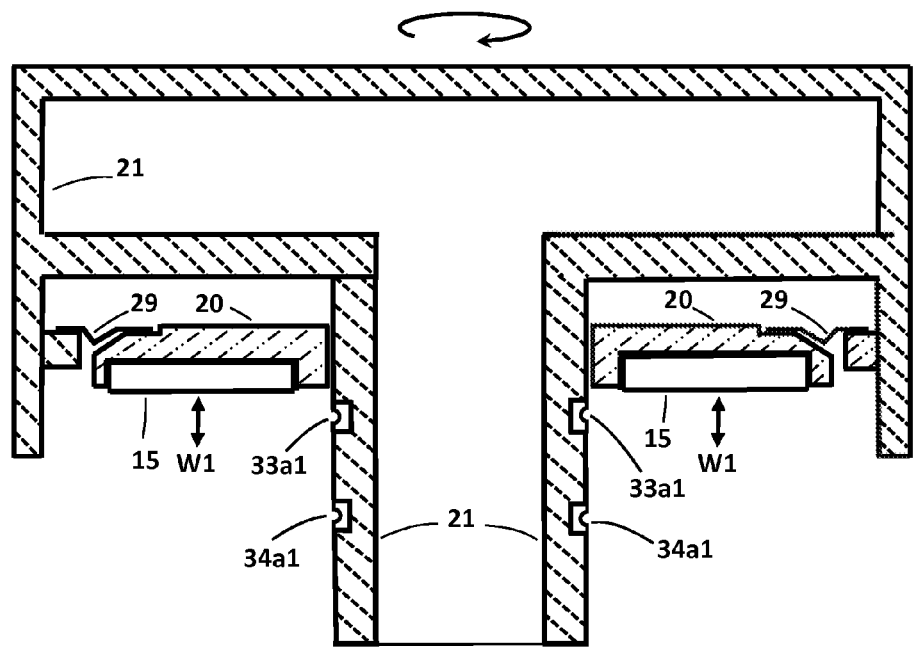
FIG. 11 is a side view of the rotatable turret with the upper seal plate flexibly attached thereto separate from the base with the lower seal plate mounted thereon.
Figure 12:
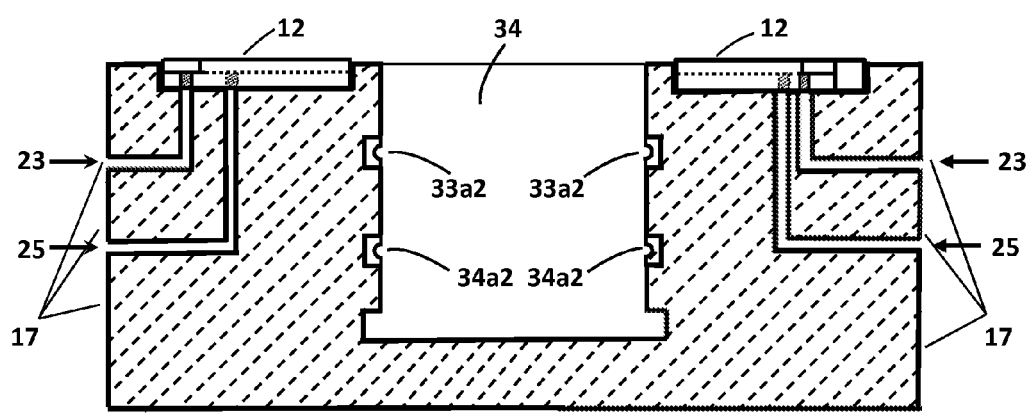
FIG. 12 is a side view of the base with the lower seal plate mounted thereon separate from the turret with the upper seal plate.
Figure 13:
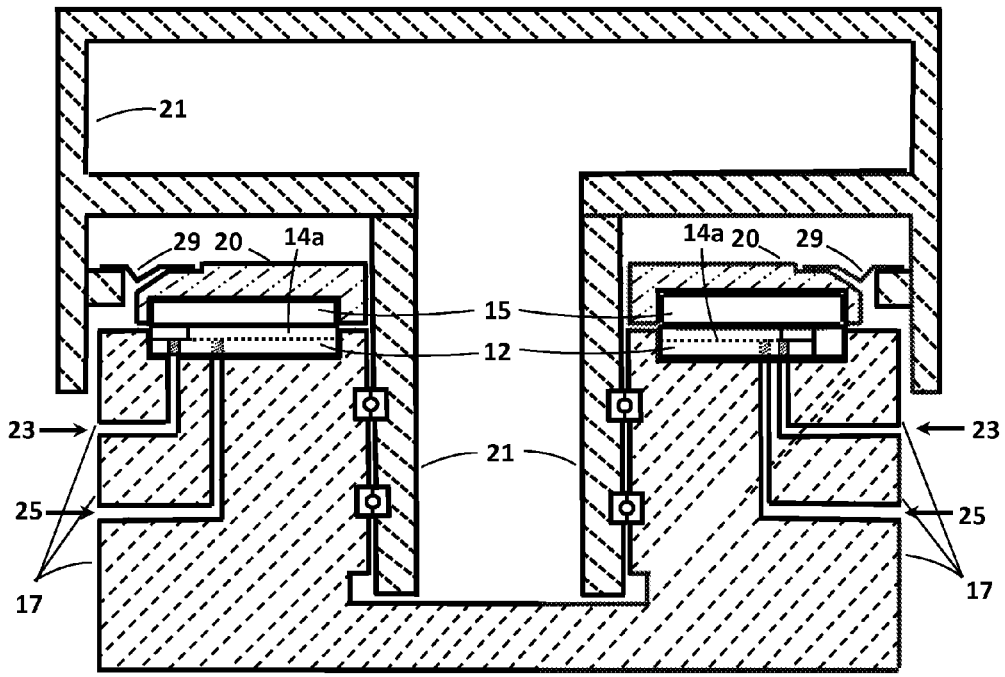
FIG. 13 is a side view showing the rotatable turret with the upper seal plate flexibly attached thereto mounted onto the base with the lower seal plate mounted thereon, and no gas pressure is applied so the two seal plates are in their static mode creating an air and liquid tight seal.
Figure 14:
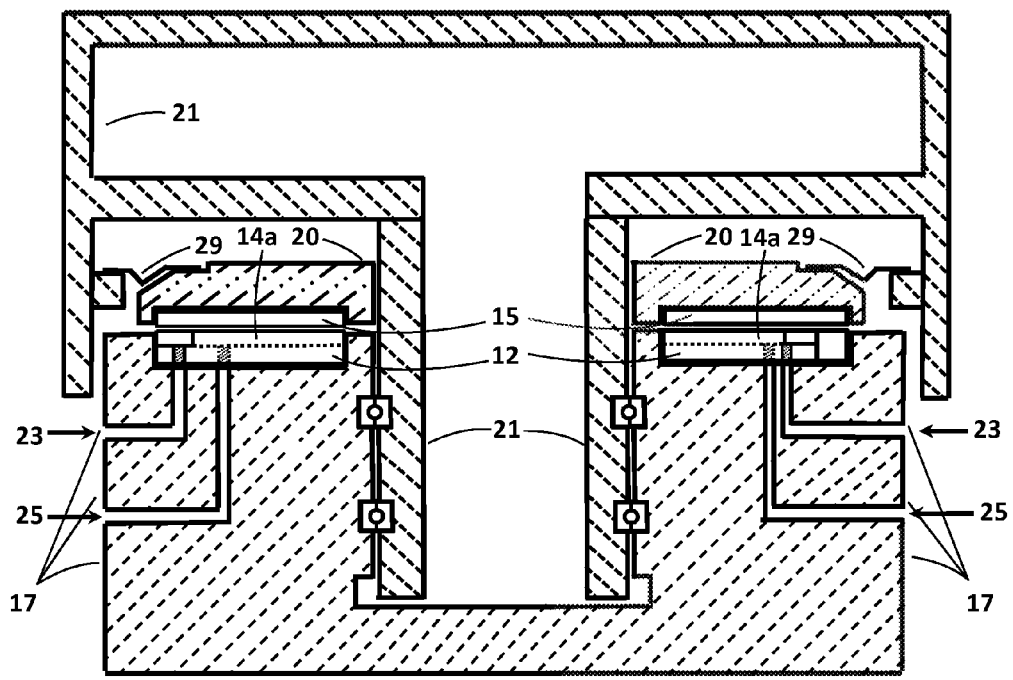
FIG. 14 is a side view showing the rotatable turret with the upper seal plate flexibly attached thereto mounted onto the base with the lower seal plate mounted thereon, and gas pressure is applied between the two seal plates to create a gas bearing.

In FIGS. 11 and 12 are shown the two main components that comprise a system with which the novel dual mode seal is utilized. As mentioned in the Summary of the Invention an example of such a system comprises a rotatable turret 21 (e.g. a dome) (FIG. 11) and a base 17 (FIG. 12) on which turret 21 is mounted (FIGS. 13 & 14). FIG. 11 shows a side cutaway view of rotatable turret 21 to which the upper seal plate 15 is attached. FIG. 12 shows a side cutaway view of base 12 to which the lower seal plate 12 is attached. Both FIGS. 11 and 12 being a cutaway view, upper seal 15 in FIG. 11 appears as two pieces but it is really one circular, donut shaped piece around the lower part of turret 21, and lower seal plate 12 in FIG. 12 appears as two pieces but it is really one circular, donut shaped piece on top of base 17. The lower part of turret 21 passes both through center hole 16 of upper seal plate 15, and through center hole 13 of the lower seal plate 12 when turret 21 is assembled to base 17.

More particularly, in FIG. 11, upper seal plate 15 is mounted in a groove in the bottom side of a mounting plate 20. Mounting plate 20 is also a circular, donut shaped piece with a hole through its middle through which the lower part of turret 21 passes. Mounting plate 20 is in turn flexibly attached by a circular, donut shaped diaphragm or bellows 29 to the top of a circular ledge on the inside of rotatable turret 21 as shown. Mounting plate 20 is not fastened to the lower part of turret 21 as shown by the small space between mounting plate 20 and the lower part of turret 21. Diaphragm 29 permits upper seal plate 15 and its mounting plate 20 to move vertically as shown by the double headed arrow W1 in FIG. 11. Upper seal plate 15 is moved upward as gas pressure is applied to the bottom side upper seal 15 from an arcuate groove in the top side of lower seal plate 12, and moves downward as the gas pressure is removed. This is better explained with reference to FIGS. 13 and 14. When upper seal plate 15 is moved upward, moving its mounting plate 20 and flexing diaphragm 29, to separate it from lower seal plate 12, turret 21 may be rotated as indicated by the circular arrow shown above turret 21 in FIG. 11.

Inside the enclosed area at the top of turret 21 may be mounted antennas and/or electro-optical elements that need to be rotated and be protected from conditions outside turret 21. Static sealing material may be used around optical or other windows in turret 21 that are used to transmit electromagnetic energy inward or outward.

On the outside of the lower portion of turret 21 are mounted the inner part 33a1 and 34a1 of two ball bearing retainers, which are part of an angular contact duplex ball bearing assembly. (not shown) is mounted in the groove of each of parts 33a1 and 34a1 during the assembly of turret 21 to base 17, and shown in final position in FIGS. 13 and 14.

FIG. 12 is a side cutaway view of base 17 to which the lower seal plate 12 is attached in a non-flexible but stress-free manner. More particularly, in the top surface of base 17 is a circular groove in which seal plate 12 is adhesively attached. Showing how inert gas is routed to each of the arcuate grooves in the top surface of lower seal plate 12 is very difficult so the representation shown in FIG. 12 is not accurate but best helps understand what is happening. Dry inert gas is shown as being inserted into base 17 at channels 23 and 25 on both the left and right side of base 17. In reality there is only one set of inputs for the inert gas that is used to separate the upper and lower seal plates 12 and 15 and maintain their separation for as long as desired. Mounting plate 20 with upper seal plate 15 fastened thereto then moves downward under the influence of its own weight and the pressure internal to turret 21 which is a little higher than the outside air pressure as previously described. Internal air pressure and spring force from the diaphragm or bellows are made higher in cases where the turret mounting may be inverted with respect to gravity, such as on the bottom of an aircraft.

Although not shown in FIG. 12, but shown in FIGS. 9 and 10, inert gas (air or nitrogen) at 50-60 psi from a gas solenoid 22 (shown in and described with reference to FIGS. 15 and 16) is inserted into base 17 at channel 23 and is routed through internal channels (not shown) to and through holes 18a1, 18b1 and 18c1 through lower seal plate 12 to its arcuate grooves 14a, 14b 14c respectively. The 50-60 psi is a pulse of the inert gas at this pressure which is sufficient to push upper seal plate 15 up off its air and liquid tight seal (static mode) with lower seal plate 12 to create the separation (dynamic mode) shown in FIG. 14. Diaphragm 29 flexes to facilitate this vertical movement of upper seal plate 15. Once upper seal plate 15 is lifted off lower seal plate 12 the high pressure pulse of inert gas is terminated and is replaced by inert gas medium pressure at 25 psi as applied through flow-regulating orifices in each medium pressure gas supply hole in the lower seal plate. The medium pressure inert gas is from a gas solenoid 24 (shown in and described with reference to FIGS. 15 and 16), is inserted into base 17 at channel 25 and is routed through internal channels (not shown) into holes 18a2, 18b2 and 18c2 through lower seal plate 12, and then through flow-limiting orifice beads inside holes 18a2, 18b2 and 18 c2 to its arcuate grooves 14a, 14b 14c respectively. This medium gas pressure as regulated by negative feedback pressure drop at the orifices is sufficient to maintain a desired uniform gap spacing between seal plates 12 and 15 during the duration of the pointing or tracking rotation state (mode) of turret 21. At the end of this state (mode), the pressurized gas at input 25 is then terminated and upper seal plate 15 is pushed back down on top of lower seal plate 12 to re-create the air and liquid tight seal between the two.

The parts 33a1 thru 34a2 are intended to simply comprise a pair of angular contact duplex ball bearing assemblies to provide precision alignment of the rotation axis of turret 21 with respect to the centerline axis of the cylindrical bore of base 17 but allow free rotation. These ball bearing assemblies are designed to support a load in two orthogonal directions—in this case horizontally and vertically.

There is some friction during rotation with ball bearings compared to what would exist by making the air pressure between the seal plates carry the entire load of the turret 21 weight and at the same time maintain precision axis alignment as it would be in an alternative embodiment of the invention. In other words, the seal plates would have to act like an air bearing to support the weight of the whole turret and maintain alignment of the turret and base. This is not the case with the present invention. The gas flow required to support the entire mass of the turret would be at least ten times higher than the flow needed to just keep the seal plates apart. Also, flat seal surfaces such as in all of our discussions wouldn't provide centering of the turret axis.

In FIG. 13 is shown turret 21 assembled onto base 17 with the seal in its static mode with upper seal plate 15 being in contact with lower seal plate 12 to create the air and liquid tight seal. It can be seen that in this static mode any external air that comes under the bottom of the outer part of turret 21 is blocked by diaphragm 29 and the air and liquid tight seal between seal plates 12 and 15. As previously mentioned the weight of mounting plate 20 and any gas pressure of the inert gas inside turret 21 that is higher than the external air pressure will maintain the air and liquid tight seal between seal plates 12 and 15. A modest chamber pressure such as 8-10 psi above atmospheric pressure may result in a compressive force of well over 100 pounds on the seal plates 12 and 15 in their static mode once the air between them has been removed.

In FIG. 14 is shown turret 21 assembled onto base 17 with the seal in its dynamic mode with upper seal plate 15 being separated from lower seal plate 12 by first using a high pressure pulse of 50-60 psi of inert gas applied at input 23 to separate the two seal plates, followed by inert gas at 25 psi applied at input 25 to maintain the two seal plates 12 and 15 in their dynamic state of being separated as shown. In this dynamic, separated state turret 21 may be rotated with respect to base 17. Finer details of this operation have previously been described herein. The application of the 50-60 psi and 25 psi inert gas at inputs 23 and 25 is described with reference to FIGS. 15 and 16.

It can be seen that in this dynamic mode inert gas escaping from between seal plates 12 and 15 into the turret 21 and base 17 is not wasted because it acts to maintain positive interior pressure. The amount of inert gas that escapes to the outside is small due to the very small space between seal plates 12 and 15 while in their dynamic mode. As previously mentioned this small spacing is as little as 0.5 microns but typically will be in the order of 1.0 micron.

To facilitate the transition from the dynamic mode to the static mode of operation the positive gas pressure maintained inside turret 21 and base 17 acts as a spring-like force to more quickly expel any remaining inert gas between seal ring plates 12 and 15 and to hold the plates together tightly for lowest possible leakage.

Figures 15, 16:
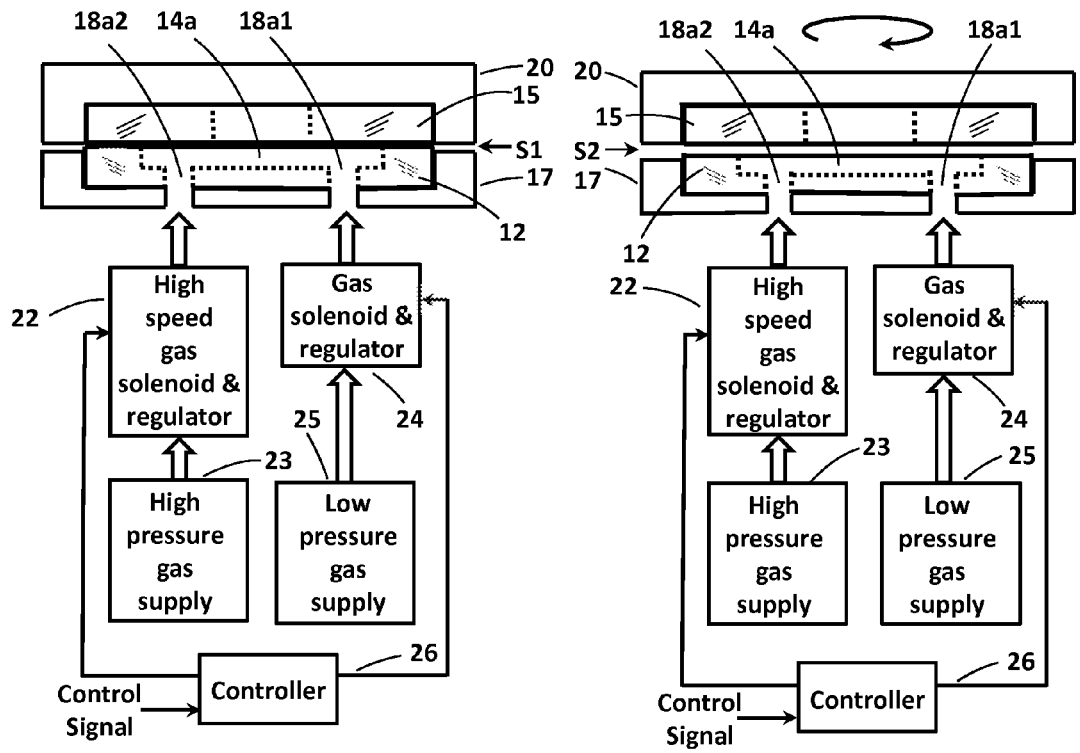
FIG. 15 is a block diagram of the control circuitry of the novel pneumatically controlled dual mode face seal when the two seal plates are in their static mode and are creating an air and liquid tight seal.
FIG. 16 is a block diagram of the control circuitry of the novel pneumatically controlled dual mode face seal when the two seal plates are in their dynamic mode and are creating a gas bearing between them.

FIGS. 15 and 16 show a block diagram of the control system used for inputting dry, pressurized inert gas from storage containers and via channels through the base 17 to the lower seal plate 12. Also see FIG. 12-14. FIG. 15 shows the dual mode face seal in its static state creating a gas and liquid tight seal between face seal plates 12 and 15. FIG. 16 shows the dual mode face seal in its dynamic state creating an air bearing between face seal plates 12 and 15 so that turret 21 (not shown in this Figure) to which mounting plate 20 is attached via diaphragm 29 (FIGS. 12-14) can rotate. Since the elements in both FIGS. 15 and 16 are the same much of the detailed description for FIG. 15 is not repeated for FIG. 16.

In FIG. 15 is shown a block diagram of how a controller 26 controls gas solenoid and pressure regulators 22 and 24 to input dry inert gas from gas supplies 23 and 25, through channels (no element numbers), through base 17 (see FIGS. 12-14) and holes 18a1 and 18a2 through seal ring plate 12 to arcuate groove 14a. The dry inert gas is also applied to arcuate grooves 14b and 14c via the channels through base 17, but arcuate grooves 14b and 14c are not shown in this figure to avoid cluttering the drawings and making it more difficult to understand the operation of the invention.

Initially, the dual mode seal plates 12, 17 are in their static state as shown in FIG. 15. In the static state seal plates 12 and 15 are in contact with each other to create an air and liquid tight seal as previously described. When it is desired to change to the dynamic state, which is when it is desired to rotate turret 21 and mounting plate 20 attached thereto, as previously described, a control signal initialized by an operator is sent to controller 26. In response thereto controller sends a signal to high speed gas solenoid and pressure regulator 22 which opens and forwards a pulse of dry inert gas (typically air or nitrogen) from high pressure gas supply 23 via the channels through base 17 and through lower seal plate 12 (holes 18a1 and 18a2) to arcuate groove 14a. The duration of this pulse is typically 10 milliseconds. As previously described the high pressure inert gas is typically 50 psi. A dessicant cartridge may be placed inside the housing containing the above described components.

Turning to FIG. 16. Responsive to the high pressure gas pulse generated using gas solenoid 22, upper seal plate 15 is separated from lower seal plate 12 by a very small distance that is sufficient to create a gas bearing in the dynamic mode. More particularly, in the dynamic mode the spacing between seal plates 12 and 15 is as little as 0.5 microns but typically will be in the order of 1.0 micron.

After the seal plates 12 and 15 are separated by the high pressure dry inert gas pulse, as shown in FIG. 16, controller 26 disables gas solenoid 22 and, instead, energizes gas solenoid and pressure regulator 24. Solenoid 24 opens and forwards lower pressure dry inert gas (typically air or nitrogen) from low pressure gas supply 25 via channels through base 17 and through lower seal plate 12 (holes 18a1 and 18a2) to arcuate groove 14a. As previously described the dry, low pressure inert gas is typically 25 psi. As long as solenoid and pressure regulator 24 is operated the low pressure gas supply is connected to arcuate groove 14a and maintains the separation of seal plates 12 and 15 in their separated, dynamic mode.

After the turret 21 connected to mounting plate 20 via diaphragm 29 (see FIGS. 13 and 14) is rotated to a desired position the air bearing created by seal plates 12 and 15 is terminated. The control signal to controller 26 is terminated and the controller causes gas solenoid and pressure regulator 24 to cease operating. This terminates the supply of inert gas from low pressure gas supply 25. The spring pressure created by deflecting diaphragm 29 (see FIGS. 13 and 14) to the dynamic state of the seal plates 12 and 15 cause the seal plates to return to their static state in contact with each other and creating an air and liquid tight seal. A dessicant cartridge may be placed inside the housing containing the above described components.

In FIG. 17 is shown an alternative embodiment 12a of lower seal plate 12. Instead of three arcuate grooves 14a,b,c, as described hereinabove, there are two concentric, circular grooves 33 and 34 that are separated by a circular ridge 35. Grooves 33 and 34 have the same depth as the arcuate grooves. Holes 18a1, 18b1 and 18c1 (the high pressure feed holes) all lie in the outer circular groove 34, and holes 18a2, 18b2 and 18c2 (the low pressure feed holes with orifice bead inserts) all lie in the inner circular groove 33. More or fewer feed holes may be utilized. The top of ridge 35 is the level with the top of the other topmost portions of lower seal plate 12a. The outer diameter of lower seal 12a is the same as lower seal 12 seen in other figures. The diameter of inner hole 13a is the same as hole 13 through lower seal 12 seen in other figures. It should be noted that the self-leveling function of the alternative seal as illustrated in FIG. 17 with a single continuous circular inner groove 33 may be improved by separating this groove into three separate arcuate grooves as in the preferred embodiment of the invention Likewise, the outer groove 34 shown as a complete circle in FIG. 17 may also be separated into three arcuate grooves if desired.

Low maintenance is a key feature of the novel dual mode hydraulic seal. Twelve months or more between maintenance may be made possible by low leak rate during off-periods and minimal pneumatic control air usage during change between the static mode and the dynamic mode. A small dessicant cartridge may possibly be required, but should not need frequent replacement.

While what has been described herein is a preferred embodiment of the invention and one alternative embodiment, those skilled in the art will recognize that changes may be made with departing from the spirit and scope of the invention which is a dual state/mode pneumatic seal.

For example in the embodiment of the invention described herein inert gas is applied to all arcuate grooves 14a,b,c at the same time. In an alternate embodiment of the invention the inert gas may be applied to these three grooves via different channels and at different times in a sequential manner.

For another example, when the novel dual mode seal is in its static state a separate pressure chamber or a spring means may be utilized to apply pressure to keep the upper and lower seal plate in contact with each other.

The invention claimed is:

1. A pneumatically controlled dual mode face seal having a first mode and a second mode, the face seal comprising:

a first, flat plate having a first face and a second face, and having at least one groove in the first face, and there is a first hole through the first plate from its second face to the at least one groove in its first face, and there is a second hole through the first plate from its second face to the at least one groove in its first face;

a second, flat plate having a first face and a second face;

wherein in the first mode of the dual modes the first face of the first plate touches the first face of the second plate to create a high friction between the first and second flat plates that inhibits movement of the first plate and the second plate with respect to each other and creates a gas and liquid tight seal between the first plate and second plate, wherein in the second mode of the dual modes the first face of the first plate does not touch the first face of the second plate and the first flat plate and the second flat plate have no friction with respect to each other that inhibits movement of the first plate and the second plate with respect to each other, wherein to change the first and second plates from the first mode to the second mode gas at a first pressure is applied via the first hole to the at least one groove in the first face of the first plate to separate the first plate and second plate and create a gas bearing there between that permits the first and second plates to be easily moved with respect to each other, and wherein after the first plate and second plate are separated, gas at a second pressure that is lower than the first pressure is applied via the second hole to the at least one groove in the first face of the first plate to maintain the face seal in the second mode, and when it is desired to return the first and second flat plates to the first mode where they touch each other and create a gas and liquid tight seal the gas at the second pressure is terminated.

2. The pneumatically controlled, dual mode face seal of claim 1 further comprising a plurality of holes through the first plate from its second face to the at least one groove in its first face, and the gas at the first pressure is applied via the holes to the at least one groove in the first face to change the dual mode face seal between the first mode and the second mode.

3. The pneumatically controlled, dual mode face seal of claim 2 wherein there are multiple grooves in the first face of the first plate, one of the first group of the holes through the first plate goes to each of the multiple grooves, and one of the second group of the holes through the first plate goes to each of the multiple grooves and thereby the gas at the first pressure and gas at the lower second pressure may be applied to each of the multiple grooves.

4. The pneumatically controlled, dual mode face seal of claim 1 wherein there are multiple grooves in the first face of the first plate, there are a first group of holes through the first plate that go to each of the multiple grooves, and there are a second group of holes through the first plate that go to each of the multiple grooves and thereby the gas at the first pressure and gas at the lower second pressure may be applied to each of the multiple grooves.

5. The pneumatically controlled, dual mode face seal of claim 4 further comprising a first hollow element and a second hollow element that must occasionally be rotated with respect to each other along a common axis, wherein the first plate is affixed to the first element and the second plate is affixed to the second element so that the first and second plates create the dual mode face seal, there is a gas and liquid tight seal between the first and second elements in the first mode created by the first plate and the second plate being in contact with each other, a gas bearing is created between the first and second elements by the first and second plates in the second mode when they are separated from each other and the first and second elements may be freely rotated with respect to each other.

6. The pneumatically controlled, dual mode face seal of claim 5 further comprising a flexible member having a first and a second edge, the second edge is attached to the second element and the first edge is attached to the second plate, when the first and second plates are in the second mode they are separated and the first and second elements can be easily rotated with respect to each other, and when the first and second plates are in the first mode they are in contact with each other creating a high friction between the first and second flat plates that inhibits the first and second elements from being rotated, the flexible member permitting the first and second plates to change between the first mode and the second mode without the first and second elements having to be physically moved with respect to each other along their common axis.

7. The pneumatically controlled, dual mode face seal of claim 1 for use with a first hollow element and a second hollow element that must occasionally be rotated with respect to each other along a common axis, wherein the first plate is affixed to the first element and the second plate is affixed to the second element so that the first and second plates create the dual mode face seal, there is a gas and liquid tight seal between the first and second elements in the first mode created by the first plate and the second plate being in contact with each other, a gas bearing is created between the first and second elements by the first and second plates in the second mode when they are separated from each other and the first and second elements may be freely rotated with respect to each other.

8. The pneumatically controlled, dual mode face seal of claim 7 further comprising a flexible member having a first and a second edge, the second edge is attached to the second element and the first edge is attached to the second plate, when the first and second plates are in the second mode they are separated and the first and second elements can be easily rotated with respect to each other, and when the first and second plates are in the first mode they are in contact with each other creating a high friction between the first and second flat plates that inhibits the first and second elements from being rotated, the flexible member permitting the first and second plates to change between the first mode and the second mode without the first and second elements having to be physically moved with respect to each other along their common axis.

9. A pneumatically controlled, rotational, dual mode face seal having a first mode and a second mode, the face seal comprising:

a first, flat plate having a first face and a second face, and having at least one groove in the first face and there is at least one hole through the first plate from its second face to the at least one groove in its first face; and a second, flat plate having a first face and a second face;

wherein in the first mode of the dual modes the first face of the first plate touches the first face of the second plate to create a high friction between the two plates that inhibits rotation of the two plates with respect to each other, wherein in the second mode of the dual modes there is a gas bearing created between the first face of the first plate and the first face of the second plate and there is little or no friction inhibiting rotation of the two plates with respect to each other, and wherein to change the first and second plates from the first mode to the second mode gas at a first pressure is applied to the at least one groove in the first face of the first plate to separate the first and second plates, and to maintain the separation between the first plate and the second plate, gas at a second pressure is applied via the at least one hole to the at least one groove in the first face of the first plate, and while the first and second flat plates are in the second mode the gas at the second pressure creates the gas bearing that permits the first and second plates to be easily rotated with respect to each other, and when such rotation has been accomplished the gas at a second pressure is terminated and the first and second flat plates return to the first mode where the first plate and the second plate touch each other.

10. The pneumatically controlled, dual mode face seal of claim 9 wherein after the face seal is in the second mode the gas at the second pressure is applied via the at least one hole to maintain the face seal in the second mode.

11. The pneumatically controlled, dual mode face seal of claim 10 wherein the at least one hole comprises a first plurality of holes and a second plurality of holes through the first plate from its second face to the at least one groove in its first face, and the gas at the first pressure is applied to the at least one groove is applied via the first plurality of holes and the gas at the second pressure is applied to the at least one groove is applied via the second plurality of holes.

12. The pneumatically controlled, dual mode face seal of claim 11 further comprising a coating material on the first face of the first plate and the first face of the second plate, and when the face seal is in the first mode the coating material contributes to there being a gas and liquid tight seal between the first and second plates plate.

13. The pneumatically controlled, dual mode face seal of claim 9 further comprising a coating material on the first face of the first plate and the first face of the second plate, and when the face seal is in the first mode the coating material contributes to there being a gas and liquid tight seal between the first and second plates plate.

14. The pneumatically controlled, dual mode face seal of claim 13 for use with a first element and a second element that must occasionally be rotated with respect to each other along a common axis, wherein the first plate is affixed to the first element and the second plate is affixed to the second element so that the first and second plates create the dual mode face seal, there is a gas and liquid tight seal between the first and second elements in the first mode created by the first plate and the second plate being in contact with each other, a gas bearing is created between the first and second elements by the first and second plates in the second mode when they are separated from each other and the first and second elements may be freely rotated with respect to each other.

15. The pneumatically controlled, dual mode face seal of claim 14 further comprising a flexible member having a first and a second edge, the second edge is attached to the second element and the first edge is attached to the second plate, when the first and second plates are in the second mode they are separated and the first and second elements can be easily rotated with respect to each other, and when the first and second plates are in the first mode they are in contact with each other creating a high friction between the first and second flat plates that inhibits the first and second elements from being rotated, the flexible member permitting the first and second plates to change between the first mode and the second mode without the first and second elements having to be physically moved with respect to each other along their common axis.

16. The pneumatically controlled, dual mode face seal of claim 9 wherein the face seal is utilized with a first element and a second element that must occasionally be rotated with respect to each other along a common axis, wherein the first plate is affixed to the first element and the second plate is affixed to the second element so that the first and second plates create the dual mode face seal, and further comprising a flexible member having a first and a second edge, the second edge is attached to the second element and the first edge is attached to the second plate, when the first and second plates are in the second mode they are separated and the first and second elements can be easily rotated with respect to each other, and when the first and second plates are in the first mode they are in contact with each other creating a high friction between the first and second flat plates that inhibits the first and second elements from being rotated, the flexible member permitting the first and second plates to change between the first mode and the second mode without the first and second elements having to be physically moved with respect to each other along their common axis.

17. The pneumatically controlled, dual mode face seal of claim 16 wherein the first and second elements are hollow and when the face seal is in the first mode the gas seal between the first and second plates prevents anything from entering the hollow first and second elements.

18. A pneumatically controlled dual mode face seal having a first mode and a second mode, the face seal comprising:
a first, flat plate having a first face and a second face, having a plurality of grooves in the first face, and having a plurality of first holes through the first plate from its second face to its first face with at least one first hole to each of the plurality of grooves in the first face, and having a plurality of second holes through the first plate from its second face to its first face with at least one second hole to each of the plurality of grooves in the first face;
a second, flat plate having a first face and a second face;
wherein in the first mode of the dual modes the first face of the first plate touches the first face of the second plate to create a high friction between the first and second flat plates that inhibits movement of the first plate and the second plate with respect to each other and creates a gas and liquid tight seal between the first plate and second plate,
wherein in the second mode of the dual modes the first face of the first plate does not touch the first face of the second plate and the first flat plate and the second flat plate have no friction with respect to each other that inhibits movement of the first plate and the second plate with respect to each other,
wherein to change the first and second plates from the first mode to the second mode gas at a first pressure is applied via each of the first holes to each of the plurality of grooves in the first face of the first plate to separate the first plate from the second plate and create a gas bearing there between that permits the first and second plates to be easily moved with respect to each other, and
wherein after the first plate and second plate are separated, gas at a second pressure that is lower than the first pressure is applied via each of the plurality of second holes to each of the plurality of grooves in the first face of the first plate to maintain the face seal in the second mode, and when it is desired to return the first and second plates to the first mode where they touch each other and create a gas and liquid tight seal the gas at the second pressure is terminated.

* * * * *